Figure 1:
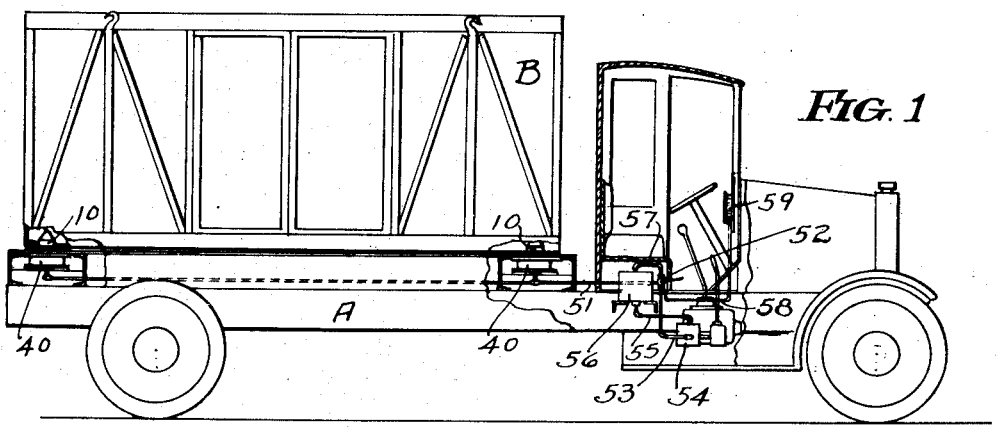

Nov. 12, 1935.  B. F. FITCH  2,020,307
LOAD WEIGHING DEVICE
Filed Oct. 24, 1932  3 Sheets-Sheet 1

Inventor
Benjamin F. Fitch
By Daley, Golrick & Teare
Attorneys

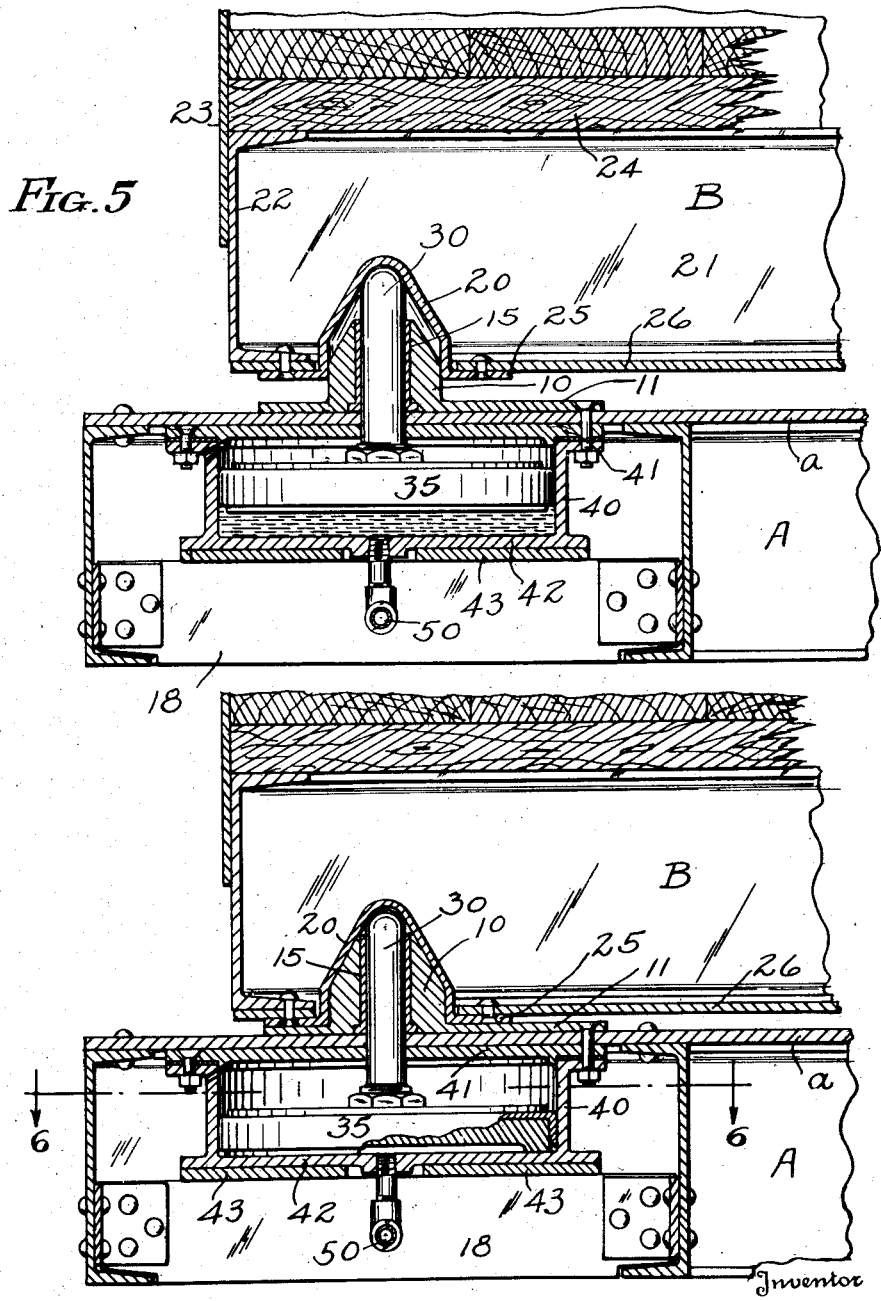

Nov. 12, 1935.  B. F. FITCH  2,020,307
LOAD WEIGHING DEVICE
Filed Oct. 24, 1932   3 Sheets-Sheet 3

Inventor
Benjamin F. Fitch,
By Bates, Golrick & Teare,
Attorneys

Patented Nov. 12, 1935

2,020,307

UNITED STATES PATENT OFFICE 2,020,307

LOAD WEIGHING DEVICE

Benjamin F. Fitch, Greenwich, Conn., assignor to Motor Terminals Company, Wilmington, Del., a corporation of Delaware Application October 24, 1932, Serial No. 639,279

4 Claims. (Cl. 265—40)

In the handling of package freight by a demountable truck body, which may be transported on a highway truck and lifted with its load to a railway car or vice versa, it is very desirable to be able to weigh the body with its load to determine the proper freight charge. Frequently scales are not available at railway transfer points, and moreover, to move the body to the vicinity of a scale, lift it from the truck, deposit it on the scale and thereafter lift it from the scale and return it to the truck or railway car would entail a considerable expenditure of time and energy.

It is the object of this invention to provide very simple means on the truck itself, whereby the body, with its contained load may be readily weighed as a unit, so that there need be no delay in determining the weight of the contents.

To the above end I provide on the truck frame suitable body raising mechanism which is connected with an indicator, and when this mechanism is operated the body is raised sufficiently to carry the weight entirely by the weighing mechanism, so that the indicator indicates at once the weight of the body with its load. If the weight of the body is known, the indicator may be readily set to give directly the weight of the contents.

Demountable bodies having recesses in their bases, and trucks having upwardly extending projections adapted to enter the recesses to position the bodies on the trucks, are in satisfactory use, the same being covered by my Patent No. 1,772,939. I have found that I can readily combine with such anchorages means to lift the body slightly to obtain an indication of its weight. I effect this by placing cylinders and pistons directly below the anchorages and providing plungers operated by pistons, which extend upwardly through the male anchorages and adapted to engage the sockets in the body, whereby all four plungers may be operated as a unit hydraulically to raise the body, without disturbing the positioning engagement of the anchorages. When the body is thus raised and supported hydraulically, a pressure gauge in communication with the cylinders may indicate the weight of the loaded body and hence of the load itself. This is also a feature of my invention.

My invention is illustrated in the drawings hereof, and is hereinafter more fully described, and the essential novel characteristics are set out in the claims.

Figure 2:
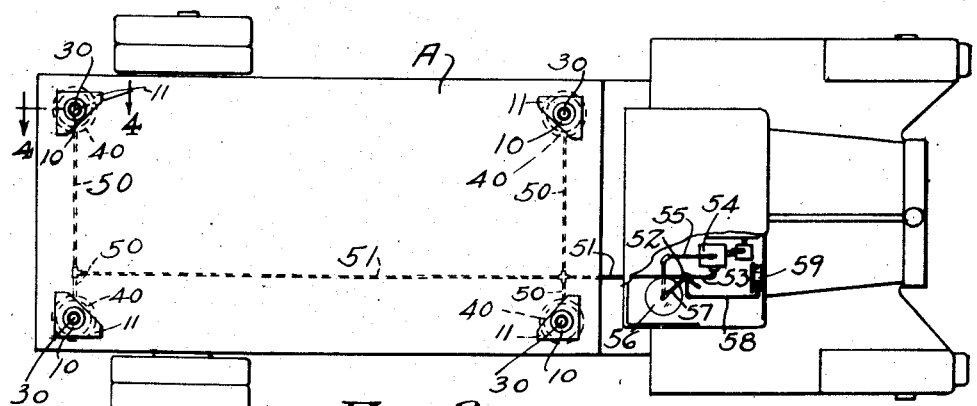
Figure 3:
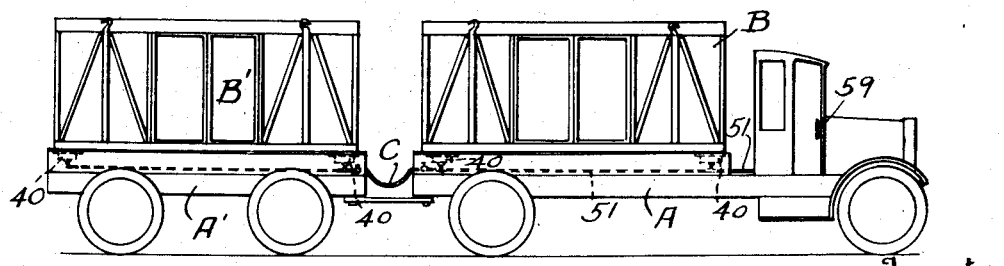
Figure 6:
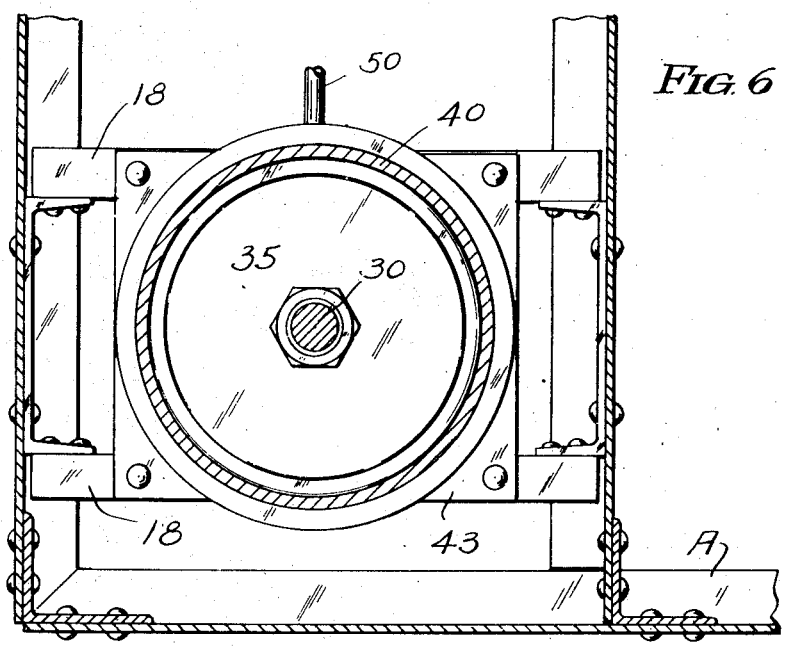
Figure 7:
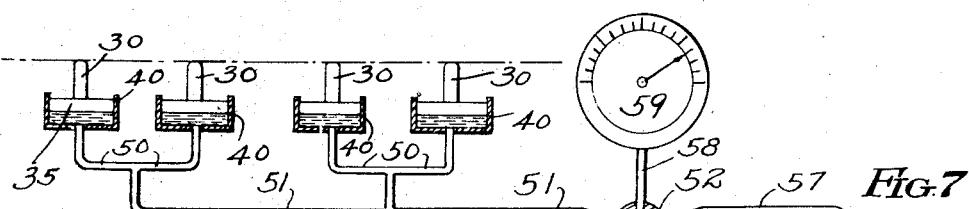
Figures 8, 9:
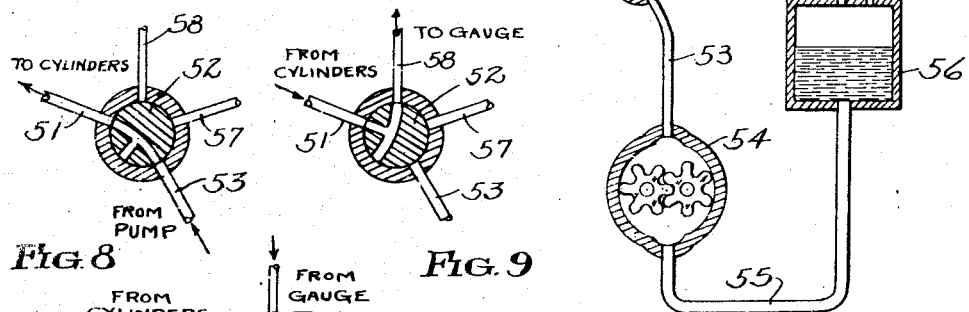
Figure 10:
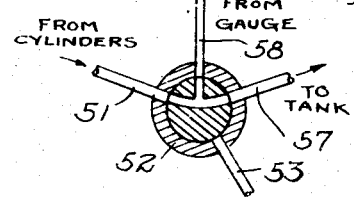

In the drawings, Fig. 1 is a side elevation partly broken away of a truck, equipped with my body weighing mechanism; Fig. 2 is a plan of such truck, the body being removed; Fig. 3 is a side elevation of a truck and a trailer, each of which have my weighing mechanism; Figs. 4 and 5 are vertical cross-sections through one of the anchorage devices on the truck, showing the weighing mechanism in idle position and in active position respectively; Fig. 6 is a horizontal section through one of the weighing devices as indicated by the line 6—6 on Fig. 4; Fig. 7 is a diagram illustrating the piping between the oil tank, pump, cylinders and gauge; Figs. 8, 9 and 10 are diagrams illustrating three positions of the oil valve.

In Figs. 1 to 6, "A" indicates a truck of the usual type having a horizontal rear platform or support for carrying a demountable body. Such demountable body is indicated at B. Fig. 3 shows at A' a trailer, and B' a body mounted thereon, these corresponding in general to the rear portion of the truck A and body B.

On the truck body A, I mount upstanding projections 10, adapted to enter sockets 20, carried by demountable bodies. There are at least four of these projections arranged at the four corners of a rectangle, adapted to cooperate with four sockets 20 in the body adjacent its four corners. The body may have side sills 21 and end sills 22 carrying side and end walls 23 and supporting a suitable floor 24. Within the space beneath the floor and bounded by the side and end sills, adjacent the corners of such space, I mount the sockets 20. As shown in Figs. 4 and 5, these sockets are stamped members having flanges 25 extending beneath and riveted to suitable stiffening gussets 26, secured to the bottom flanges of the side and end sills. This makes a very firm construction of socket member within the base of the body.

The positioning members 10 on the truck frame have laterally extending base flanges 11 (shown as of triangular shape in Fig. 2), which are bolted or otherwise secured to the top plate a of the truck-frame A. These projections are cylindrical for a distance above the base and then become conical, so that they coact with the complementary sockets first to position a body being lowered and then hold it accessibly in position.

The construction so far described corresponds to that of my patent mentioned.

To provide the weighing mechanism in an effective manner, without requiring additions to the body, I make the projections 10 hollow and I extend upwardly through such projections plungers operated hydraulically so that the body may be raised slightly and the weight measured by hydraulic pressure transmitted to a pressure indicator. To this end I form a bore in each of the projections 10, this bore being preferably lined by a bushing 15. Slidably mounted in this bushing is a plunger 30, having a dome-shaped upper end corresponding to the dome-shaped cavity at the top of the socket 20. This plunger 30 extends downwardly through the projection 10, through the floor a and through the top 41 of a cylinder 40, closed at its lower end at 42. Within the cylinder is a piston 35 to which the plunger 30 is rigidly connected. The cylinder at its top is secured to the underside of the truck floor a, as shown in Figs. 4 and 5, and may also be supported by a bottom plate 43, resting on truck beams 18.

It results from the construction described that the male and female anchorages may be used in exactly the same manner as heretofore, the upper end of the plunger 30 constituting the top of the male anchorage in idle position shown in Fig. 4, and thus serving to engage the socket of the body and guide the same to place as the body is being lowered.

At the same time, by supplying fluid under pressure to the cylinders 40 beneath the pistons, the body may be lifted slightly without disturbing the holding effect of the projections and sockets. When lifted the weight is borne entirely by the liquid, and hence the pressure of the liquid in pounds per square inch multiplied by the square inches of area of the various pistons will equal the weight in pounds of the container with its load. Hence, a suitably graduated pressure gauge in communication with the hydraulic system may readily indicate the weight of the loaded body.

The four cylinders 40 in position to coact with the four corners of the body, are indicated in Figs. 2 and 7 as connected by a cross piping 50 and longitudinally piping 51, with a suitable controlling valve 52. From this controlling valve a pipe 53 leads to a pump 54, which communicates by a pipe 55 with a supply tank 56. The pipe 57 leads from the valve directly to this tank and another pipe 58 leads from the valve to a pressure gauge 59.

When it is desired to weigh the load on the body, the operator turns the valve 52 to the position shown in Fig. 8 and starts the pump 54. This forces liquid from the tank into the four cylinders 40, raising the plungers 30 to lift the bodies. The pump 54 is shown as a rotary pump, but this is merely for the purpose of illustration, as a piston pump or any other form designed to put the oil under proper pressure may be employed.

As soon as the body has been lifted sufficiently so that the weight is borne entirely by the plungers 30 and their pistons, the operation of the pump is stopped and the operator turns the valve to the position shown in Fig. 9. This connects the cylinders with the pressure gauge 59 and the needle at once moves to a position indicative of the load carried by the four pistons. If the bodies used on the truck have a standard weight the gauge may readily be set with its zero corresponding to the position caused by an empty body, and in that case the additional graduations of the gauge could directly indicate the weight of the contents of the body.

After the operator reads the weight on the gauge 59 he turns the valve 52 to the position shown in Fig. 10, which connects both the lines 51 and 58 with the return line 57 of the tank and this frees the pressure both in the cylinders and in the gauge and accordingly the body descends to its normal position of rest and the gauge needle returns to idle position.

A weighing system similar to that above described may be employed on trailers as indicated by the trailer A' in Fig. 3. In this case, the trailer truck has positioning devices, plungers, pistons and cylinders the same as already described for the truck A, while the conduit to these different cylinders is connected by a flexible hose C (Fig. 3) with a conduit on the automotive truck. The same system by successive flexible connections might be carried out with a number of trailers. The pressure gauge on the automotive truck may be put in communication simultaneously with the hydraulic systems of the truck and all the trailers to indicate the total load carried, or, if desired, individual piping could be extended from the pump and gauge on the truck to each of the trailers to weigh each load separately.

It will be seen that my weighing mechanism may be readily mounted on existing trucks or trailers, or new vehicles, of standard type, and that no change whatever is needed in the bodies, since the plungers coact with the positioning sockets already on the body. When the weighing system is idle the operation of placing, transporting and removing the body is exactly as at present, but whenever desired, the operator may ascertain the total weight of the contents of the body very quickly and easily and without interfering with the most efficient routine in handling the body.

I claim:

1. The combination of a wheeled truck and a demountable body therefor, four hollow upstanding positioning members carried by the truck frame and adapted to coact with downwardly facing sockets in the base of said demountable body, each positioning member having a tapered upper portion and a vertical lower portion, to enable the body to be readily placed and still held fixedly when placed, each projection being hollow, a vertical plunger in each projection, means for raising the plungers to lift the body and means for indicating the downward pressure on the raised plungers.

2. A vehicle having a series of vertical cylinders, pistons in the respective cylinders, plungers rising from the cylinders and hollow upstanding bosses surrounding the plungers, combined with a demountable body having a socket in its base adapted to coact with the plungers and with the bosses, and means for operating the pistons to cause the plungers to raise the body a short distance but not enough to free it from the bosses, and means affected by the downward pressure on the plungers for indicating the weight on the plungers.

3. The combination with an automobile truck having a frame projecting at the rear of the driver's cab, four corner positioning members carried by said frame, each comprising a hollow upstanding projection, a demountable body, which may be mounted on the truck frame, such body having in its base adjacent the corners upwardly extending sockets, which are adapted to embrace the projections, four vertical cylinders carried by the truck frame directly beneath the projections, pistons in said cylinders, plungers rising from said pistons passing upwardly through the projections and adapted to engage the top portions of the sockets.

4. The combination of an automobile truck and a demountable body therefor having four downwardly facing sockets, four corner positioning members carried by said truck, each comprising a hollow, upstanding projection, said projections being located at the four corners of a rectangle in position to engage the sockets in the demountable body, four vertical cylinders carried by the truck frame directly beneath the projections, pistons in said cylinders, plungers rising from said pistons passing upwardly through the projections, adapted to engage the top portions of the sockets, a pressure conduit leading to the various cylinders below the pistons, means for supplying liquid under pressure to said conduit, and a gauge in communication with the cylinders.

BENJAMIN F. FITCH.